US008131041B2

(12) United States Patent
Ter Mors

(10) Patent No.: US 8,131,041 B2
(45) Date of Patent: Mar. 6, 2012

(54) SYSTEM AND METHOD FOR SELECTIVE BLENDING OF 2D X-RAY IMAGES AND 3D ULTRASOUND IMAGES

(75) Inventor: Maarten Ter Mors, Sassenheim (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1060 days.

(21) Appl. No.: 11/997,441

(22) PCT Filed: Jul. 12, 2006

(86) PCT No.: PCT/IB2006/052380
§ 371 (c)(1),
(2), (4) Date: Jan. 31, 2008

(87) PCT Pub. No.: WO2007/017772
PCT Pub. Date: Feb. 15, 2007

(65) Prior Publication Data
US 2008/0219540 A1    Sep. 11, 2008

Related U.S. Application Data

(60) Provisional application No. 60/706,864, filed on Aug. 9, 2005.

(51) Int. Cl.
*G06K 9/00* (2006.01)
(52) U.S. Cl. ..................................................... 382/131
(58) Field of Classification Search .................. 382/128, 382/131, 132
See application file for complete search history.

(56) References Cited

U.S. PATENT DOCUMENTS 6,421,454 B1 * 7/2002 Burke et al. .................. 382/131
7,935,055 B2 * 5/2011 Burckhardt .................. 600/300

OTHER PUBLICATIONS

G. Langs et al., "Building and Registering Parameterized 3D Models of Vessel Trees for Visualization During Intervention", Pattern Recognition, 2004, ICPR 2004, Proc. of the 17th Intl. Conf. on Cambridge, UK, Aug. 23-26, 2004, Piscataway, NJ, IEEE, vol. 3, pp. 726-729.

* cited by examiner

*Primary Examiner* — Jurie Yun

(57) ABSTRACT

A system and method for simultaneously imaging a structure using two different imaging modalities and blending the images into a single blended two dimensional image, is provided. The system and method include obtaining two dimensional (2D) x-ray image data (132) using an x-ray system (102) and three dimensional (3D) ultrasound image volume data (134) using an ultrasound imaging system (122). A 2D representation of the 3D ultrasound image volume data (134) is created with respect to an area of interest corresponding to the 2D x-ray image data (132). The 2D representation of the 3D ultrasound image volume data (134) is blended with the 2D x-ray image data (132) using a computer (130) to render a 2D blended image (140) of the structure that can be displayed in real-time. The computer (130) may be part of the x-ray system (102), part of the ultrasound system (122) or a standalone unit with its own display device (136).

20 Claims, 4 Drawing Sheets

SYSTEM AND METHOD FOR SELECTIVE BLENDING OF 2D X-RAY IMAGES AND 3D ULTRASOUND IMAGES

CROSS REFERENCE TO RELATED APPLICATIONS

This application claims the benefit of International Application Number PCT/IB2006/052380, filed Jul. 12, 2006, and U.S. Provisional Application Ser. No 60/706,864 filed Aug. 9, 2005 which are incorporated herein the whole by reference.

The present disclosure relates to combining a two dimensional (2D) x-ray image with a three dimensional (3D) ultrasound image, and more particularly, a method and apparatus for combining a 2D x-ray image with a 3D ultrasound image in guided cardiac interventions creating a blended 2D image from the 2D x-ray and 3D ultrasound images, without obscuring relevant x-ray information.

Cardiologists use catheters in the heart to acquire diagnostic information (either injecting dye for angiograms or sensing electrical information). They also may use devices such as radiofrequency ablation catheters to deliver therapy to the heart. These diagnostic and treatment devices are typically maneuvered in the heart based on a x-ray fluoroscopic image. It is well known that intravascular x-ray fluoroscopy has superior contrast and resolution of the vessels and the vessel wall compared to that provided by other known intravascular imaging methods, such as, intravascular ultrasound and angioscopy. This often results in fluoroscopy times of one hour or more during prolonged electrophysiological procedures, and results in substantial radiation exposure for both the patient and cardiologist, especially when considering the frequent need for repeat procedures. In addition, the heart is a three dimensional structure whereas the fluoroscopic image is only two dimensional. And since knowing the exact anatomic location of a diagnostic or treatment device in the heart is extremely important in order to acquire accurate diagnostic information or to accurately deliver a therapy to particular locations in the heart, the conventional use of fluoroscopic images alone is often inadequate.

Current methods for anatomical imaging arterial walls during cardiac interventional procedures, for example, includes using imaging modalities of both x-ray and ultrasound simultaneously, which is widely known. Both the two dimensional (2D) x-ray images and three dimensional (3D) ultrasound images are generated to provide useful information to the physician. This requires the presence of an x-ray fluoroscopy system and an ultrasound scanner in the same room, with a compatible table. The disadvantages are numerous and include: alternating between two imaging modalities can alter the position of the catheter; alternating between two imaging modalities is time consuming attempting to mentally superimpose or coordinate the two images together; and both the patient and the physician are exposed to harmful ionizing radiation.

To make effective use of the two sources of information, a blend of the two sources of information is needed. However, because the two imaging modalities differ greatly (resolution, projection, field of view) and are presented on separate displays with separate controls, it is difficult to make effective use of this information.

The current state of the art in blending does not take features in the image into account. This leads to a loss of visibility of the high-resolution detail of the x-ray fluoroscopic images, for example.

Despite efforts to date, a need remains for an effective and flexible/versatile approach to enhance the visibility of structures that have low contrast in x-ray imaging, and which helps in an intervention to determine where catheters are located in a cardiac anatomy. In addition, there remains a need for a method and apparatus to shorten electrophysiology (EP) procedures, in which an electrical roadmap of the heart is constructed and thereby, shortening the procedure to reduce exposure to x-ray dosages for both patient and physician.

These and other needs are met by the disclosed method and apparatus that is adapted to combine separate 2D x-ray and 3D ultrasound images into a single 2D image, particularly for use during guided cardiac interventions.

The present disclosure provides a method for imaging a structure. The method includes obtaining two dimensional (2D) x-ray image data using an x-ray system and obtaining three dimensional (3D) ultrasound image volume data using an ultrasound system. A 2D representation of the 3D ultrasound image volume data is created with respect to an area of interest corresponding to the 2D x-ray image data. The 2D representation of the 3D ultrasound image volume data is blended with the 2D x-ray image data rendering 2D blended image data of the structure and the 2D blended image data is displayed as a 2D blended image of the structure. In an exemplary embodiment, the x-ray image data and the ultrasound image data are obtained simultaneously while the 2D blended image of the structure is displayed in real-time. The blending may occur in a computer, which is part of the x-ray system, ultrasound system or a standalone unit with a display device.

The present disclosure also provides a system for blending features of interest of a structure from three dimensional (3D) ultrasound image data with two dimensional (2D) image data. The system includes a x-ray imaging system configured to provide two dimensional (2D) x-ray image data; an ultrasound imaging system configured to provide three dimensional (3D) ultrasound image volume data; and a computer in operable communication with the x-ray system and the ultrasound system. The computer is configured to create a 2D representation of the 3D ultrasound image volume data with respect to the area of interest corresponding to the 2D x-ray image data and blend the 2D representation of the 3D ultrasound image volume data with the 2D x-ray image data rendering a 2D blended image of the structure. A display device is in operable communication with the computer to display the 2D blended image of the structure.

In an exemplary embodiment, the x-ray image data and the ultrasound image data are obtained simultaneously while the 2D blended image of the structure is displayed in real-time. The blending may occur in a computer, which is part of the x-ray system, ultrasound system or a standalone unit with a display device.

Additional features, functions and advantages associated with the disclosed system and method will be apparent from the detailed description which follows, particularly when reviewed in conjunction with the figures appended hereto.

To assist those of ordinary skill in the art in making and using the disclosed system and method, reference is made to the appended figures, wherein.

As set forth herein, the present disclosure advantageously permits and facilitates blending of images from two imaging modalities (e.g., x-ray and ultrasound) that takes features of the image into account, thereby retaining visibility of the high resolution detail provided by the x-ray images (e.g., x-ray fluoroscopy). The present disclosure may be advantageously employed with medical imaging during cardiac interventional procedures, for example, to provide useful information to the physician in a blended image displayed on a single screen that is characterized by an overlay of a 2D projection of the 3D ultrasound data onto the 2D x-ray and may be selectively controlled to vary the amount of blending desired, as will be apparent to persons skilled in the art. The disclosed system and method is adapted to be part of the x-ray system or ultrasound system or otherwise be a standalone system having its own display device associated therewith.

Figure 1:
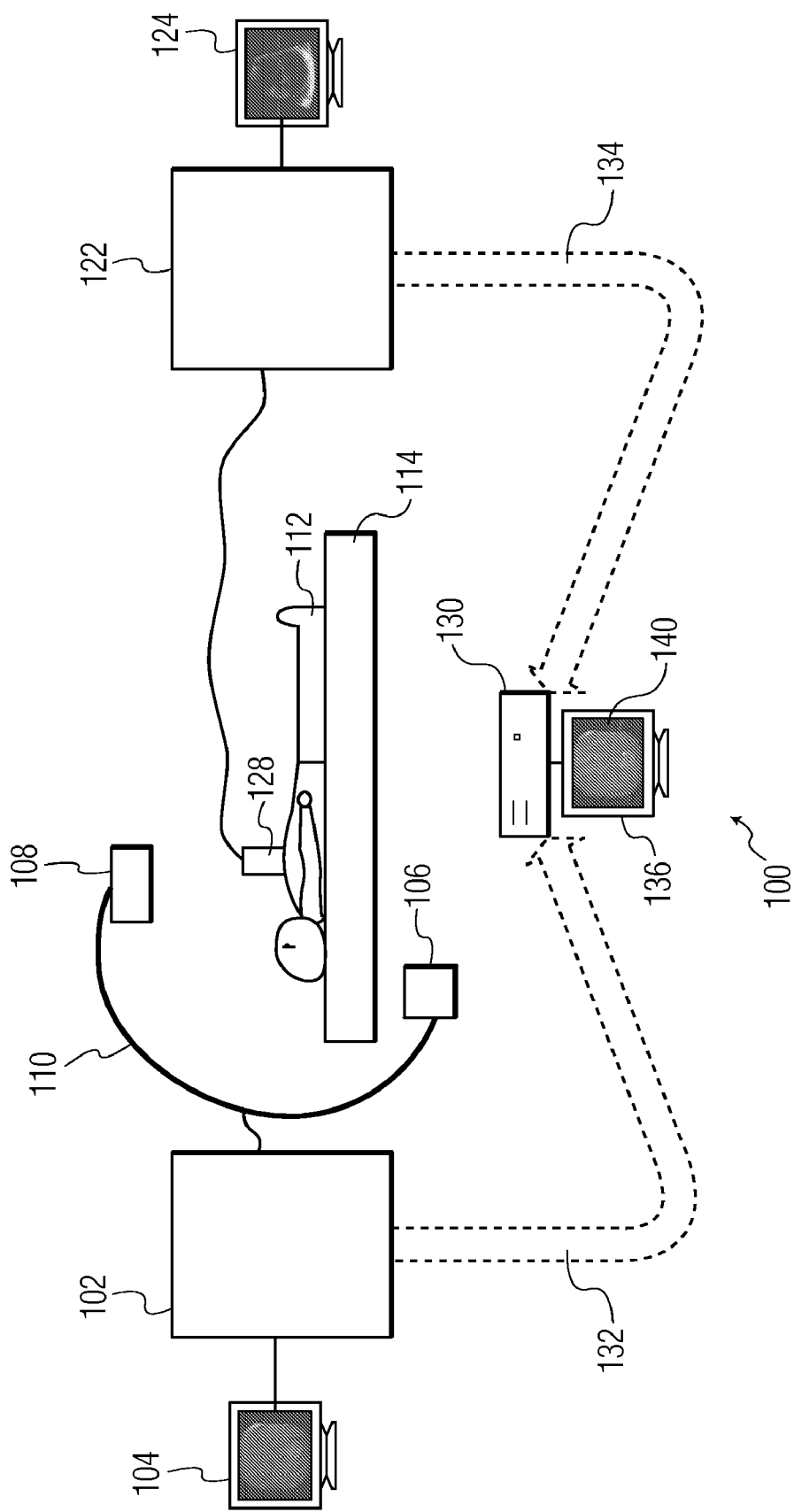
FIG. 1 is a schematic view of an exemplary implementation of a system of the present disclosure illustrating an x-ray system and an ultrasound system operably connected to a blending computer and monitor for displaying a blended image of an anatomical structure with respect to a patient lying on a table.

With reference to FIG. 1, an exemplary imaging system 100 is schematically depicted. System 100 includes a conventional television x-ray system 102, which may include a corresponding monitor 104 for viewing two dimensional (2D) x-ray data generated by x-ray system 102. X-ray system 102 includes a x-ray tube 106 and a x-ray detector 108 operably connected to x-ray system 102 via a C-shaped arm 110. X-ray tube 106 and x-ray detector 108 are disposed on opposing terminal ends defining arm 110. X-ray tube 106 generates x-rays (not shown) through a patient 112 supported by a table 114 and detected with x-ray detector 108 to generate x-ray image data 132 for eventual display on monitor 104.

System 100 further includes a conventional real-time three dimensional (3D) ultrasound system 122, which may include a corresponding monitor 124 for viewing 3D ultrasound image volume data 134 generated by ultrasound system 122. Ultrasound system 122 includes a probe 128 configured to generate a signal corresponding to an acoustic echo emanating from a corresponding volume of patient 112. Probe 128 is disposed over a volume of interest of patient 112 in order to generate a reconstructed 3D array of values that represent the strength of the acoustic echo emanating from a corresponding volume of patient 110 and generate a 3D ultrasound image volume data for eventual display on monitor 124.

Patient 112 is imaged by both modalities simultaneously and the live image/volume data from both systems 102, 122 is gathered on a computer 130 that blends the two data streams 132, 134 together to produce one combined 2D image on a monitor 136 in operable communication with computer 130. FIG. 1 and the accompanying description thereof disclose a system and method to blend 3D ultrasound volume data 134 with 2D x-ray image data 132. The eventual output reflected on monitor 136 is a 2D blended image 140. The x-ray data 132 consists of absorption values, represented as grey shades, while the ultrasound volume data 134 is a reconstructed 3D array of values that represent the strength of an acoustic echo emanating from each position in the volume of interest.

Figure 2:
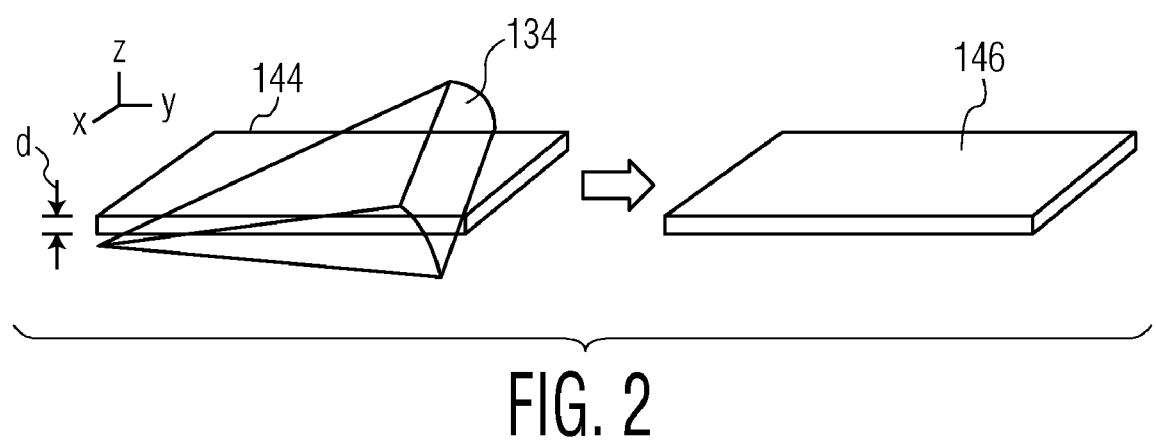
FIG. 2 is a perspective schematic view of 3D volume image data from the ultrasound system of FIG. 1 superimposed with a corresponding slice of thickness "d" therefrom to render a 2D representation of the 3D volume image data for overlay on a corresponding 2D x-ray image data in accordance with an exemplary embodiment of the present disclosure.
Figure 3:
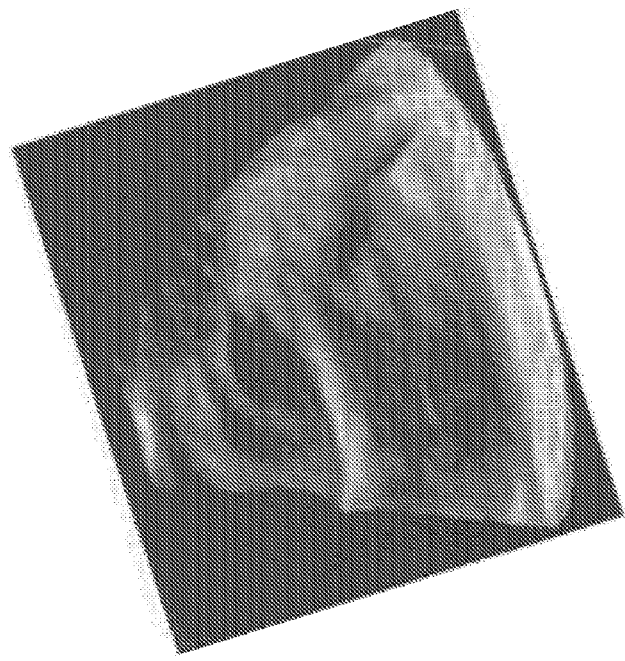
FIG. 3 is a screen view of the 3D volume image data generated from the ultrasound system of FIG. 1.
Figure 4:
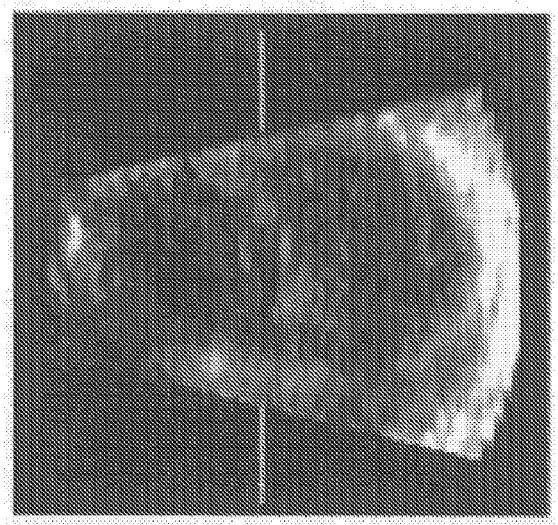
FIG. 4 is a screen view of a 2D rendered slice of the 3D volume image data of FIG. 3 rendered by the blending computer of FIG. 1 in accordance with an exemplary embodiment of the present disclosure.

Referring to FIGS. 2-4, the first step includes creating a 2D representation of the ultrasound data 134, in order to be able to blend it with the 2D x-ray image data 132. This is done by taking a sliced volume 144 of thickness d from the volume data 134 (FIG. 2) and performing a volume render operation on the sliced volume 144 to render a 2D representation of sliced volume 144 indicated generally at 146. The rendered sliced volume 146 corresponds to an image plane of the 2D x-ray image data 132. FIG. 2 illustrates the above described slice process.

A typical volume render operation includes a maximum intensity projection that casts rays through the sliced volume 134 and produces the cumulative intensity at a corresponding output pixel. It will be recognized by those of ordinary skill in the pertinent art that the above described volume render method and other volume render methods are well known and fall outside the scope of the present disclosure. FIG. 3 illustrates an image of the 3D volume data on monitor 124 while FIG. 4 illustrates an image of the rendered 2D image of the same volume of interest of FIG. 3 that may be viewed on monitor 136.

Subsequently, the ultrasound rendered slice volume 146 is rendered on top of the x-ray image data 132. This is not done by a simple "cookie cut" operation, in which case a rectangular area of the x-ray image would be entirely obscured. The ultrasound rendered slice volume 146 is blended with the underlying x-ray image data 132 using a blending technique described more fully below in accordance with an exemplary embodiment of the present disclosure. The method of blending includes a form of alpha blending, but is not limited thereto. An alpha value ($\alpha$), between 0 and 1, gives a ratio in which two overlapping pixels contribute to the color of a screen pixel by the following equation:

$$C_{out,RGB}(x,y) = \alpha C_{xray,RGB}(x,y) + (1-\alpha) C_{us,RGB}(x,y)$$

Alpha ($\alpha$) is, in common applications in computer graphics, a constant or a function of (x,y). For purposes of the present disclosure, a space dependence is set to zero. In addition, in the method described herein, $\alpha$ depends on a color (C) of the x-ray image data 132 ($C_{xray,RGB}$) and data associated with the rendered ultrasound volume 146 ($C_{us,RGB}$). Therefore, $$\alpha(x,y,C_{xray,RGB},C_{us,RGB}) = k\alpha(x,y)\alpha(C_{xray,RGB})\alpha(C_{us,RGB})\alpha_t \in [0,1].$$

As stated above, $\alpha(x,y)$ is a constant value. In an exemplary embodiment, the value of $\alpha(x,y)$ is 0.5 in which there is equal blending between the x-ray image data 132 and data associated with the rendered ultrasound volume 146. The value of $\alpha(x,y)$ can be used later to add position-dependent enhancement of detected catheter tips (not shown) in the x-ray image. In other words, the value of $\alpha(x,y)$ is increased so that the x-ray image data 132 will prevail locally over the ultrasound image data when a catheter tip is detected in the viewed image 140 on monitor 136. The value k is used as a blend factor bias that a physician can control to fade the data from the rendered ultrasound image volume 146 in and out with respect to the x-ray image data. The initial value of k is 1, but it can be varied between zero (0) and positive infinity (+∞). It will be noted that if, $\alpha$ becomes larger than 1 due to the value of k, $\alpha$ is clipped to 1.

A meaningful measure for alpha ($\alpha$) as a function of $C_{xray}$ and $C_{us}$ is the pixel brightness or grey value. For x-ray images, this is implicit since there is no color information: the pixel value is the brightness value (e.g., R, G and B are all equal). For the ultrasound data, color is used to improve visual contrast from the x-ray image data. The color is artificially added in the volume render process. The pixel brightness is then given by max(R,G,B).

Figure 5:
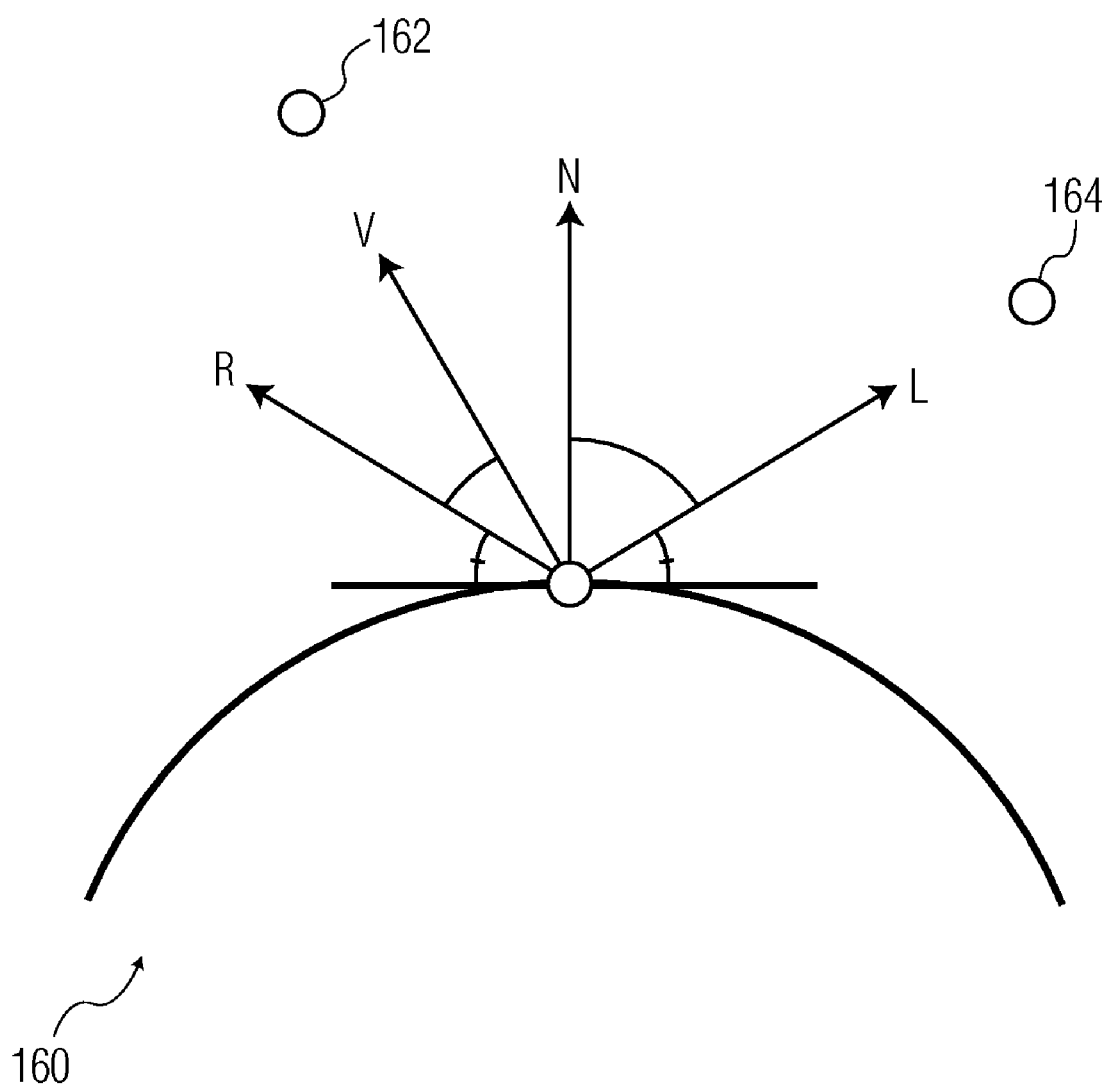
FIG. 5 is a schematic view of Phong's lighting model.

In the volume rendered meta data represented by the rendered slice volume 146 of FIG. 2, the pixel brightness is determined by the amount of light that is reflected by each voxel. FIG. 5 is representative of Phong's lighting model indicated generally at 160, which is simple yet effective. Phong's model is one of the most common lighting models in computer graphics. FIG. 5 illustrates the important inputs to Phong's lighting equation. A first dot 162 located above vector (V) indicates a camera position and a second dot 164 indicates the light source position. Vector (N) represents the surface normal. The pixel brightness is computed by casting an incoming light ray (a vector aligned with but opposite vector L) that reflects according to the surface normal (N), and taking the dot product of a reflected ray vector (R) with a view vector (V) that points to the observer. Because the result of this dot product is greatest when the normal (N) points in the direction of the observer (assuming reasonable light conditions, i.e., the surface point in question is properly lit from the observer's point of view), the tops of ridges of the imaged structure are brighter that the valleys on the surface. This corresponds to the 3D impression that a shading algorithm such as Phong's lighting model attempts to accomplish. This in itself is trivial, of course, but when linked to the brightness-dependant blending described earlier, the ridges of the rendered ultrasound surface are overlaid on top of the x-ray image and the "shadowy" valleys are not overlaid on top of the x-ray image. This enables the display of contours that represent the myocardium, for example, or other anatomical features, while the unmodified underlying x-ray image shines through between the ridges of the rendered ultrasound surface. Furthermore, this function to control the hardness of the ridges can be linked to the $\alpha(C_{us})$ function.

The present disclosure can be applied in medical imaging systems used in interventional procedures, particularly in procedures using x-ray fluoroscopy. It will be recognized that the x-ray images and ultrasound volumes are blended using computer 130, which can be part of the x-ray system 102, part of the ultrasound system 122 or a standalone unit with its own display, as illustrated in FIG. 1.

The functional application of the present disclosure enhances the visibility of structures that have low contrast in x-ray, thus assisting an interventionalist to determine a location of catheters disposed in the cardiac anatomy of a patient. This serves to shorten electrophysiology (EP) procedures, in which an electrical roadmap of the heart is constructed. With the context information provided by the ultrasound volumes, such as the myocardium, the time necessary for this roadmapping process is reduced. Because this process is conducted almost entirely under x-ray fluoroscopy, shortening the procedure reduces x-ray dose for both patient and physician.

In sum, the disclosed system, apparatus and method provide significant benefits to users of medical imaging systems, particularly physicians using x-ray and ultrasound images together during intervention procedures. Indeed, the disclosed system, apparatus and method offer enhanced visibility of structures that have low contrast in x-ray imaging and helps in an intervention to determine where catheters are located in the anatomy, as well as serving to shorten electrophysiology (EP) procedures in which an electrical roadmap of the structure within the anatomy (e.g., heart) is constructed. By using the context information provided by the ultrasound volumes, such as the myocardium for example, the resulting 2D images are more readily processed by the physician. And since this process is conducted almost entirely under x-ray fluoroscopy, the imaging procedure is shortened, thus reducing the x-ray dose for both patient and physician. In particular, the disclosed system, apparatus and method offer enhanced visibility by overlaying a 2D projection of the 3D ultrasound data onto the 2D x-ray data. This is done selectively by measuring features in both (or either) the x-ray data or the ultrasound data. In this manner, only features of interest from the ultrasound data are projected on top of the x-ray data, thereby making effective use of the two sources of information on a single display.

Although the system, apparatus and method of the present disclosure have been described with reference to exemplary embodiments thereof, the present disclosure is not limited to such exemplary embodiments. Rather, the system, apparatus and method disclosed herein are susceptible to a variety of modifications, enhancements and/or variations, without departing from the spirit or scope hereof. Accordingly, the present disclosure embodies and encompasses such modifications, enhancements and/or variations within the scope of the claims appended hereto.

The invention claimed is:

1. A method for imaging a structure, the method comprising:
   obtaining two dimensional (2D) x-ray image data;
   obtaining three dimensional (3D) ultrasound image volume data;
   creating a 2D representation of the 3D ultrasound image volume data with respect to an area of interest corresponding to the 2D x-ray image data, including:
      selecting a slice volume of thickness "d" from the volume data corresponding to a plane representative of the 2D x-ray image data;
      performing a volume rendering operation on the sliced volume;
      blending the 2D representation of the 3D ultrasound image volume data with the 2D x-ray image data rendering a 2D blended image of the structure, wherein the blending including alpha blending, the alpha blending including an alpha value ($\alpha$), between 0 and 1, giving a ratio in which two overlapping pixels contribute to a color of a screen pixel by the following equation:

$$C_{out,RGB}(x,y) = \alpha C_{xray,RGB}(x,y) + (1-\alpha) C_{us,RGB}(x,y); \text{ and}$$

displaying the 2D blended image of the structure.

2. The method according to claim 1, wherein the volume rendering includes a maximum intensity projection that casts through the sliced volume and produces a cumulative intensity at a corresponding output pixel.

3. The method according to claim 1, wherein the alpha value ($\alpha$) is a constant or a function of (x,y) and a space dependence is set to zero.

4. The method according to claim 3, wherein the alpha value ($\alpha$) depends on corresponding colors (C) of the x-ray image data and the sliced volume ultrasound image data according to the following equation: $\alpha(x,y,C_{xray,RGB},C_{us,RGB}) = k\alpha(x,y)\alpha(C_{xray,RGB})\alpha(C_{us,RGB})$ where $\alpha_i \in [0,1]$.

5. The method according to claim 4, wherein $\alpha(x,y)$ increases to allow the x-ray image data to prevail locally over the ultrasound image data of the blended image.

6. The method according to claim 4, wherein the value k is used as a blend factor bias allowing the ultrasound image data of the blended image to be faded in and out with respect to underlying x-ray image data.

7. The method according to claim 4, wherein a 2D representation of the structure as the blended image is displayed in real-time.

8. The method according to claim 1, wherein the two dimensional (2D) x-ray image data and three dimensional (3D) ultrasound image volume data are simultaneously obtained.

9. The method according to claim 1, wherein the blending occurs in a computer, which is part of one of a x-ray system, ultrasound system, and a standalone unit with a display device.

10. A non-transitory computer readable medium conveying software which controls a processor to perform the method according to claim 1.

11. A method for imaging a structure, the method comprising:
   obtaining two dimensional (2D) x-ray image data;
   obtaining three dimensional (3D) ultrasound image volume data;
   creating a 2D representation of the 3D ultrasound image volume data with respect to an area of interest corresponding to the 2D x-ray image data;
   blending the 2D representation of the 3D ultrasound image volume data with the 2D x-ray image data rendering a 2D blended image of the structure wherein the blending of overlapping pixels is dependent on a pixel brightness (b) of the 2D representation of the 3D ultrasound image volume data that is determined by the amount of light reflected by each voxel, wherein $\alpha(C_{xray})$ and $\alpha(C_{us})$ are functions of the pixel brightness (b); and
   displaying the 2D blended image of the structure.

12. The method according to claim 11, wherein the creating a 2D representation of the 3D ultrasound volume image data further comprises: selecting a sliced volume of thickness "d" from the volume data corresponding to a plane representative of the 2D x-ray image data; and performing a volume render operation on the sliced volume.

13. The method according to claim 11, wherein the pixel brightness (b) is determined by the amount of light reflected by each voxel and computed using Phong's lighting model.

14. A non-transitory computer readable medium conveying software which controls a processor to perform the method according to claim 11.

15. A system for blending features of interest of a structure from three dimensional (3D) ultrasound image data with two dimensional (2D) image data, the system comprising:
   a x-ray imaging system configured to provide two dimensional (2D) x-ray image data;
   an ultrasound imaging system configured to provide three dimensional (3D) ultrasound image volume data;
   a computer in operable communication with the x-ray system and the ultrasound system, the computer is programmed to:
      create a 2D representation of the 3D ultrasound image volume data with respect to the area of interest corresponding to the 2D x-ray image data;
      blend the 2D representation of the 3D ultrasound image volume data with the 2D x-ray image data rendering a 2D blended image of the structure, the blending of overlapping pixels being dependent on a pixel brightness (b) of the 2D representation of the 3D ultrasound image volume data that is determined by the amount of light reflected by each voxel; and
   a display device in operable communication with the computer, the display device displaying the 2D blended image of the structure.

16. The system according to claim 15, wherein the computer is further programmed to:
   select a sliced volume of thickness "d" from the volume data corresponding to a plane representing the 2D x-ray image data; and
   perform a volume render operation on the sliced volume.

17. The system according to claim 15, wherein the blending including alpha blending, wherein the alpha blending including an alpha value ($\alpha$), between 0 and 1, giving a ratio in which two overlapping pixels contribute to a color of a screen pixel by the following equation:

$$C_{out,RGB}(x,y) = \alpha C_{xray,RGB}(x,y) + (1-\alpha) C_{us,RGB}(x,y).$$

18. The system according to claim 15, wherein the 2D x-ray image data and 3D ultrasound image volume data are simultaneously obtained.

19. The system according to claim 15, wherein the structure is imaged by both the x-ray and ultrasound imaging modalities simultaneously and the 2D representation of the structure is displayed in real-time.

20. The system according to claim 15, wherein the computer is one of part of the x-ray system, part of the ultrasound system, and a standalone unit with a display device.

* * * * *